(12) United States Patent
Kwon et al.

(10) Patent No.: US 9,304,905 B2
(45) Date of Patent: Apr. 5, 2016

(54) MEMORY CONTROLLER AND DATA MANAGEMENT METHOD THEREOF

(71) Applicant: Ajou University Industry-Academic Cooperation Foundation, Suwon, Gyeonggi-Do (KR)

(72) Inventors: Se Jin Kwon, Seoul (KR); Tae Sun Chung, Gyeonggi-Do (KR); Byeong Kuk Keam, Gyeonggi-Do (KR); Rize Jin, Gyeonggi-Do (KR)

(73) Assignee: Ajou University Industry-Academic Cooperation Foundation, Suwon, Gyeonggi-do (KR)

( * ) Notice: Subject to any disclaimer, the term of this patent is extended or adjusted under 35 U.S.C. 154(b) by 153 days.

(21) Appl. No.: 14/177,924

(22) Filed: Feb. 11, 2014

(65) Prior Publication Data

US 2014/0164687 A1    Jun. 12, 2014

Related U.S. Application Data

(63) Continuation of application No. PCT/KR2012/001354, filed on Feb. 22, 2012.

(30) Foreign Application Priority Data

Aug. 12, 2011    (KR) .......................... 10-2011-0080360

(51) Int. Cl.
*G06F 12/00* (2006.01)
*G06F 12/02* (2006.01)
*G06F 3/06* (2006.01)

(52) U.S. Cl.
CPC ............ *G06F 12/0246* (2013.01); *G06F 3/064* (2013.01); *G06F 3/0616* (2013.01); *G06F 3/0679* (2013.01)

(58) Field of Classification Search
CPC .................. G06F 12/0233–12/0246; G06F 3/0638–3/0652
USPC .......................................................... 711/103
See application file for complete search history.

(56) References Cited

U.S. PATENT DOCUMENTS

| 5,924,092 A | 7/1999 | Johnson |
|---|---|---|
| 7,089,349 B2 | 8/2006 | Chang et al. |

(Continued)

FOREIGN PATENT DOCUMENTS

| JP | 2002-358233 A | 12/2002 |
|---|---|---|
| JP | 2005-0276071 A | 10/2005 |

(Continued)

*Primary Examiner* — Prasith Thammavong
(74) *Attorney, Agent, or Firm* — Mintz Levin Cohn Ferris Glovsky and Popeo, P.C.; Kongsik Kim; Jonathon P. Western

(57) ABSTRACT

The present invention provides a flash memory controller for mapping the logical addresses to the physical addresses of memory including a plurality of blocks, each having a plurality of pages, wherein the memory controller includes a processor. The processor includes hot page decision unit and an address translation unit. The hot page decision unit classifies pages in each block into hot pages and cold pages based on a predetermined criterion. When there is a plurality of the classified hot pages, the address translation unit respectively arranges the classified hot pages in different target blocks.

In accordance with this configuration, upon performing a merge operation, hot pages and cold pages are determined, and the hot pages are respectively distributed to empty blocks, so that concentration of an erase operation on a specific physical block may be avoided, thus wear-leveling may be performed more efficiently.

10 Claims, 9 Drawing Sheets

(56) References Cited

U.S. PATENT DOCUMENTS

| | | |
|---|---|---|
| 2009/0100244 A1 | 4/2009 | Chang et al. |
| 2009/0193184 A1* | 7/2009 | Yu .................... G06F 12/0246 711/103 |
| 2010/0017555 A1 | 1/2010 | Chang et al. |
| 2010/0191922 A1* | 7/2010 | Dickey .................. G06F 3/061 711/154 |
| 2011/0252210 A1* | 10/2011 | Davies ................ G06F 3/0605 711/165 |
| 2011/0271070 A1* | 11/2011 | Worthington ....... G06F 12/1009 711/165 |

FOREIGN PATENT DOCUMENTS

| | | |
|---|---|---|
| KR | 10-2008-0010965 A | 1/2008 |
| KR | 10-2008-0030756 A | 4/2008 |
| KR | 10-2008-0033649 A | 4/2008 |
| KR | 10-2008-0056491 A | 6/2008 |
| KR | 10-0874702 B1 | 12/2008 |
| KR | 10-2009-0090570 A | 8/2009 |
| KR | 10-0941423 B1 | 2/2010 |
| KR | 10-2011-0016320 A | 2/2011 |
| WO | 2008-013431 A1 | 1/2008 |

* cited by examiner

FIG. 3A
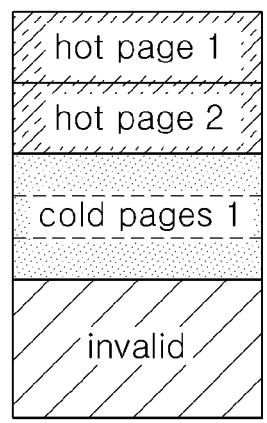
⇩ IMPROVED
MERGE OPERATION
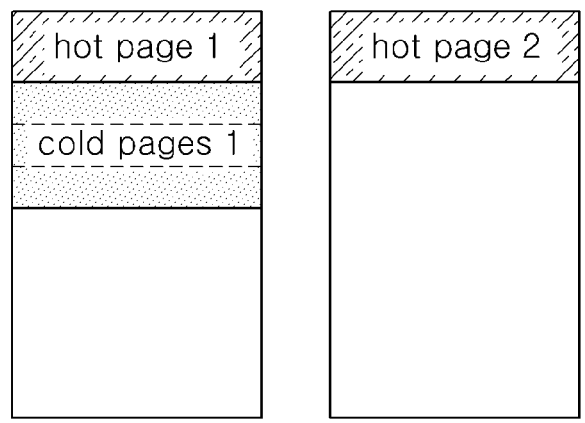

FIG. 3B
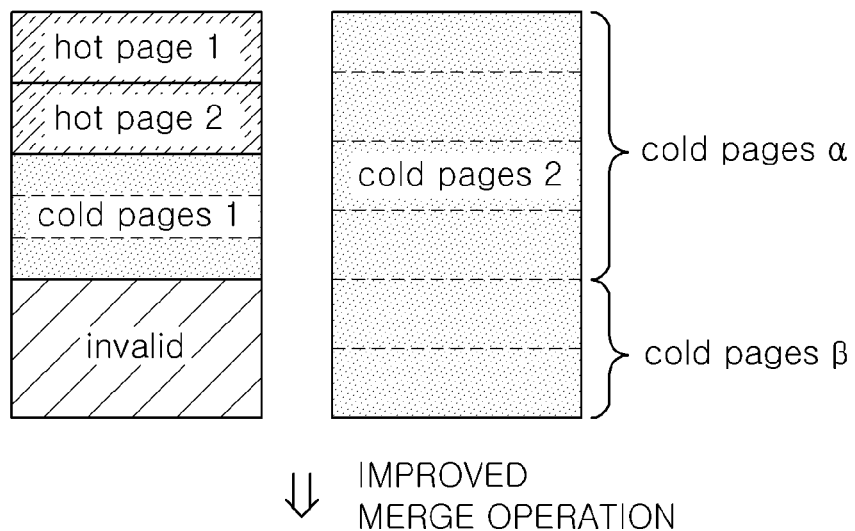
⇓ IMPROVED MERGE OPERATION
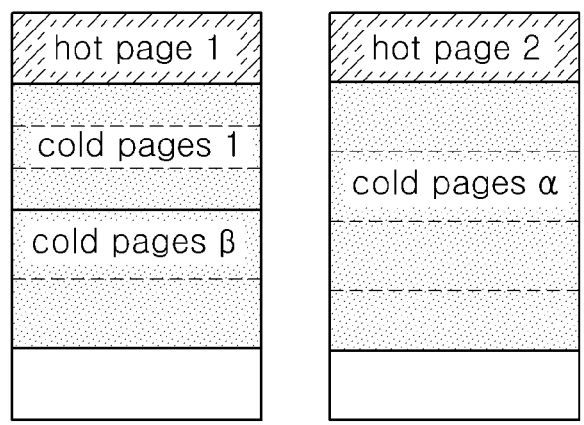

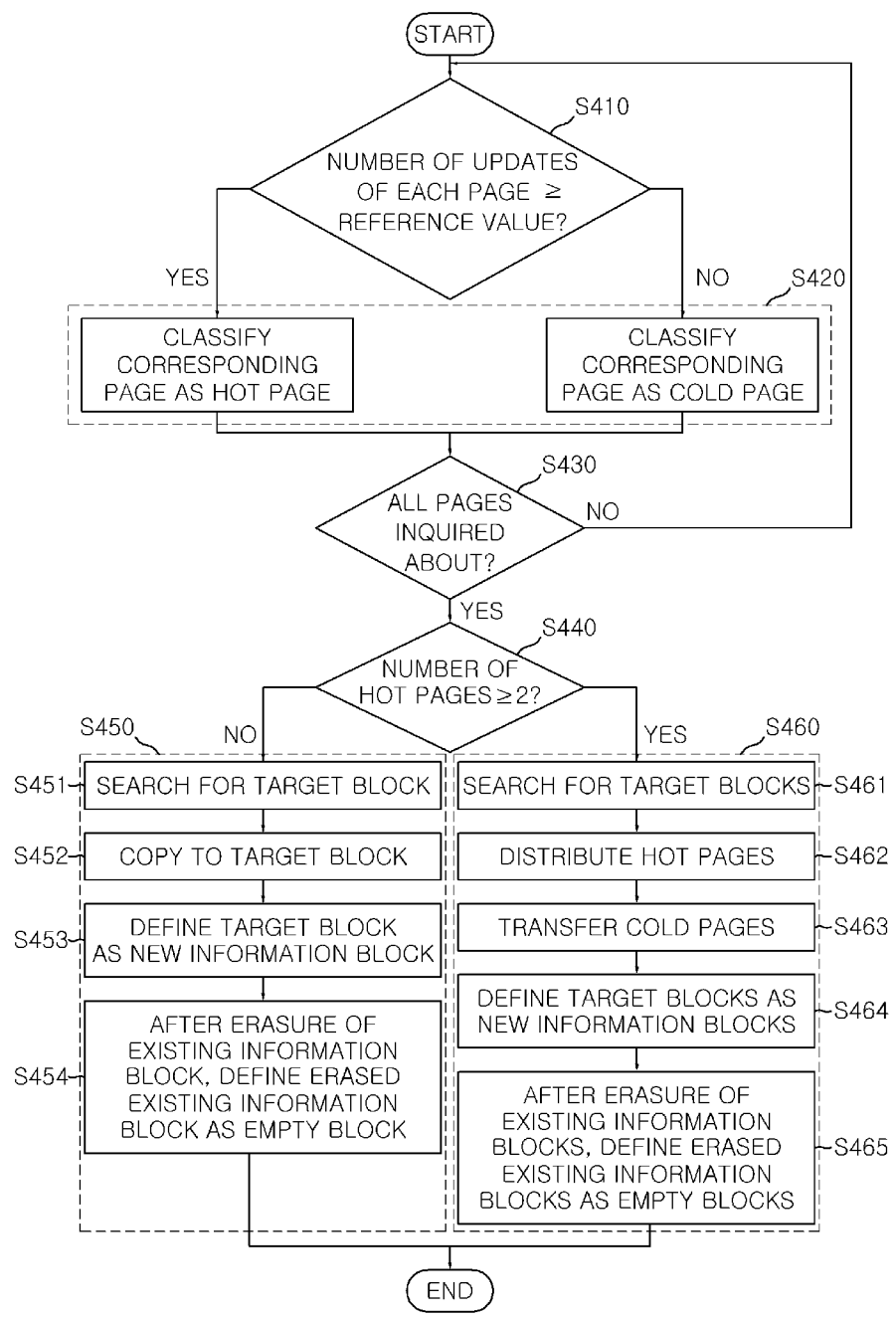

MEMORY CONTROLLER AND DATA MANAGEMENT METHOD THEREOF

CROSS-REFERENCE TO RELATED APPLICATION

This application is a continuation of PCT/KR2012/001354 filed on Feb. 22, 2012, which claims priority to Korean Application No. 10-2011-0080360 filed on Aug. 12, 2011, which applications are incorporated herein by reference.

TECHNICAL FIELD

The present invention relates, in general, to a memory controller and data management method thereof and, more particularly, to technology for taking into consideration wear-leveling while minimizing the deterioration of the performance of a flash memory device.

BACKGROUND ART

Flash memory is nonvolatile memory capable of electrically writing or erasing data, and enables the rewriting of data within a limited number of times. Information stored in flash memory is not deleted even if power is turned off, and flash memory has been widely used as storage devices for portable electronic devices, such as digital cameras, Personal Digital Assistants (PDAs), MP3 players, or mobile phones, because of its advantages, such as low-power consumption, a high operating speed, and excellent durability. Recently, flash memory has been utilized in various areas, such as a Solid State Disk (SSD) or turbo memory. Below, the structure of flash memory will be described with reference to Korean Unexamined Patent Publication No. 2011-0016320.

FIG. 1A is a diagram showing the typical structure of flash memory, and FIG. 1B is a diagram showing in detail a single page shown in FIG. 1A.

As shown in FIGS. 1A and 1B, flash memory can be divided into planes, each including a plurality of blocks, wherein each block is subdivided into a plurality of pages. Each page is divided into a sector that is an area in which data is stored, and a spare that is an area in which information about the data stored in the sector is stored. In this case, a host or a file system may recognize the sector area, but the spare area is an area managed by a Flash Translation Layer (FTL). In the spare area, information about the data stored in the sector is recorded, and thus information about the data stored in the corresponding sector area may be obtained if the spare area is referred to. For the sake of convenience of description, in FIGS. 1A and 1B, an example in which a single sector is included in a single page has been shown, but a single page may also include two or more sectors. Further, depending on representation, there may be a case where the sector area shown in FIGS. 1A and 1B is called a data area and where the data area and a spare area are integrally called a sector, and such a case shows a difference only in representation. Technical features desired to be actually described are same as shown in FIGS. 1A and 1B.

In flash memory, a write operation is performed on a page, and an erase operation is performed on a block. In order to write data to flash memory, a host transmits data to a flash memory storage device on a sector basis, and the storage device must allocate a specific page in which input data is to be stored. The flash memory cannot perform an in-place overwrite operation, and must perform an erase-before-write operation in order to overwrite new data to a previously used block, that is, a block to which data has been written. The number of times that the flash memory can be erased is limited to about one hundred thousand times in the case of a Single Level Cell (SLC) and to about ten thousand times in the case of a Multi-Level Cell (MLC).

In order to overcome such a limitation in the number of erasures, wear-leveling is required which prevents a specific block in flash memory from being intensively repeatedly used and from being more rapidly worn than other blocks, and which evenly distributes data to respective blocks with the result that all blocks are evenly worn. The functions of a Flash Translation Layer (FTL) that is a software layer are to maximize the performance of flash memory in consideration of those features, perform wear-leveling, and lengthen the lifespan of flash memory.

Technology related to a conventional wear-leveling technique in flash memory is disclosed in Korean Unexamined Patent Publication No. 10-2008-0033649 entitled "Flash memory system and management method thereof capable of reducing merge frequency." In accordance with this prior art, after a merge operation has been performed, the update frequency of the corresponding data is checked, and the operation of allocating and adjusting a separate section for wear-leveling based on the update frequency is performed.

Since such conventional wear-leveling algorithms take into consideration only wear-leveling, it is assumed that the algorithms have a separate performance improvement algorithm for efficiently utilizing read, write and erase operations. However, the prior art is impossible to implement algorithms in two fields in a single FTL due to hardware constraints. In this case, the term "hardware constraints" denotes a restriction in the number of times that partial programming of flash memory is performed. The term "partial programming restriction" denotes the number of times that a single page can be accessed. For example, in a case where the total number of accesses allowed by flash memory is three, if a performance improvement algorithm consumes two accesses, the number of accesses that the wear-leveling algorithm can use is only one. Accordingly, wear-leveling algorithms requiring partial programming two or more times cannot be used.

Further, conventional wear-leveling techniques have common ground in that wear-leveling is periodically performed depending on a predetermined time or a predetermined number of operations. Such a technique causes a large variation in the performance of flash memory according to the type of write operation. In the case of a conventional wear-leveling algorithm, the number of erase operations (Erase Count Number: ECN) performed on each block is inquired about using a read operation, and thereafter an operation of replacing pieces of information of two blocks between which a predetermined number of variations occur is performed. Since this algorithm performs wear-leveling unconditionally and periodically depending on the predetermined time or the predetermined number of operations, unnecessary read and write operations occur to inquire about information even when wear-leveling is not required. For example, in a case where a predetermined time has elapsed, but only a read operation is performed, or a case where a large number of write operations have been performed, but they are evenly distributed and then an erase operation is not performed, an operation for information inquiries is performed even if wear-leveling is unnecessary.

Therefore, data management technology that is capable of considering wear-leveling while minimizing the deterioration of the performance of a flash memory device is required.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

An object of the present invention is to provide data management technology that is capable of considering wear-leveling while minimizing the deterioration of the performance of a flash memory device.

Another object of the present invention is to provide technology that simultaneously considers performance and wear-leveling instead of performing separate wear-leveling depending on a predetermined time or the predetermined number of operations. In particular, the present invention is intended to present an improved merge operation procedure that is capable of minimizing the occurrence of a separate read or write operation for wear-leveling after a merge operation has been performed, and maximizing the effect of wear-leveling in the merge operation procedure.

In order to accomplish the above objects, the present invention provides a memory controller for managing correspondence between the logical addresses and the physical addresses of memory including a plurality of blocks, each having a plurality of pages, wherein the memory controller includes a processor, wherein the processor comprises a hot page decision unit and an address translation unit. The hot page decision unit classifies pages in each block into hot pages and cold pages based on a predetermined criterion. When there is a plurality of the classified hot pages, the address translation unit respectively arranges the classified hot pages in different target blocks.

If a number of the classified hot pages is one or less, the address translation unit may copy data stored in at least one existing physical block corresponding to a logical block to a target block, and may define the target block as an information block. And thereafter the address translation unit may erase the at least one existing physical block, and may define the erased physical block as an empty block.

If a number of the classified hot pages is more than one, the address translation unit may select at least one victim block, wherein at least one victim block does not include hot pages. And thereafter the address translation unit may divide cold pages of the victim block into a plurality of sets of cold pages, and may arrange the plurality of sets of cold pages in the plurality of target blocks.

In this case, the address translation unit may select a block, in which a number of erasures is equal to or less than a predetermined reference value, or is a least value, as the victim block.

As another example of the present invention, there is provided a data management method of a memory controller for managing correspondence between logical addresses and physical addresses of memory including a plurality of blocks, each having a plurality of pages, comprising:

classifying, by a processor, pages in each block into hot pages and cold pages based on a predetermined criterion; and respectively arranging, by the processor, the classified hot pages in different target blocks when there is a plurality of classified hot pages.

BRIEF DESCRIPTION OF THE DRAWINGS

FIGS. 3A and 3B are diagrams showing a comparison between a case where a victim block is considered and a case where a victim block is not considered upon distributing hot pages;

FIG. 4 is a flowchart showing a data management method of a memory controller according to an embodiment of the present invention;

DETAILED DESCRIPTION OF THE DISCLOSURE

The above and other objects and features of the present invention will be more clearly understood from the following detailed description taken with reference to the accompanying drawings.

The terms used herein are used merely to describe specific embodiments, but are not intended to limit the present invention. The singular expressions include plural expressions unless explicitly stated otherwise in the context thereof. It should be appreciated that in this application, the terms "include(s)," "comprise(s)", "including" and "comprising" are intended to denote the presence of the characteristics, numbers, steps, operations, elements, or components described herein, or combinations thereof, but do not exclude the probability of presence or addition of one or more other characteristics, numbers, steps, operations, elements, components, or combinations thereof.

Unless defined otherwise, all terms used herein, including technical terms or scientific terms, have the same meanings as those generally understood by persons of ordinary skill in the technical field to which the present invention pertains. The terms, such as terms that are generally used and defined in dictionaries, should be construed as having meanings identical to those that are used in the context of related technology, and should not be construed as having ideal or excessively formal meanings unless explicitly defined otherwise.

Hereinafter, preferred embodiments of the present invention will be described in detail with reference to the attached drawings. In the following description, detailed descriptions of related known elements or functions that may unnecessarily make the gist of the present invention obscure will be omitted. In the description of embodiments of the present invention, detailed values are merely examples, and exaggerated values may be presented unlike actual values, for the sake of convenience of description and clearer understanding of the invention.

The present invention is not restricted or limited to the embodiments. The same reference symbols represented throughout the drawings designate the same elements.

<Description of Flash Memory Device>

Figure 1A:
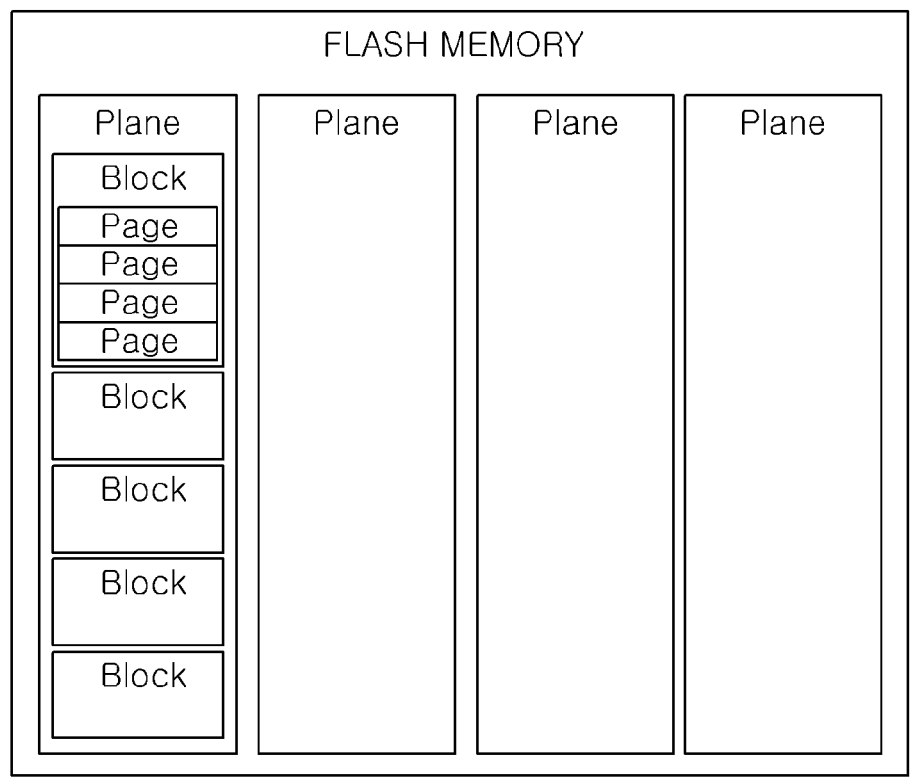
FIG. 1A is a diagram showing the typical structure of flash memory.
Figure 1B:
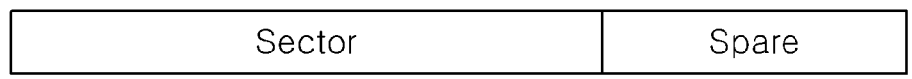
FIG. 1B is a diagram showing in detail a single page shown in FIG. 1B.
Figure 2A:
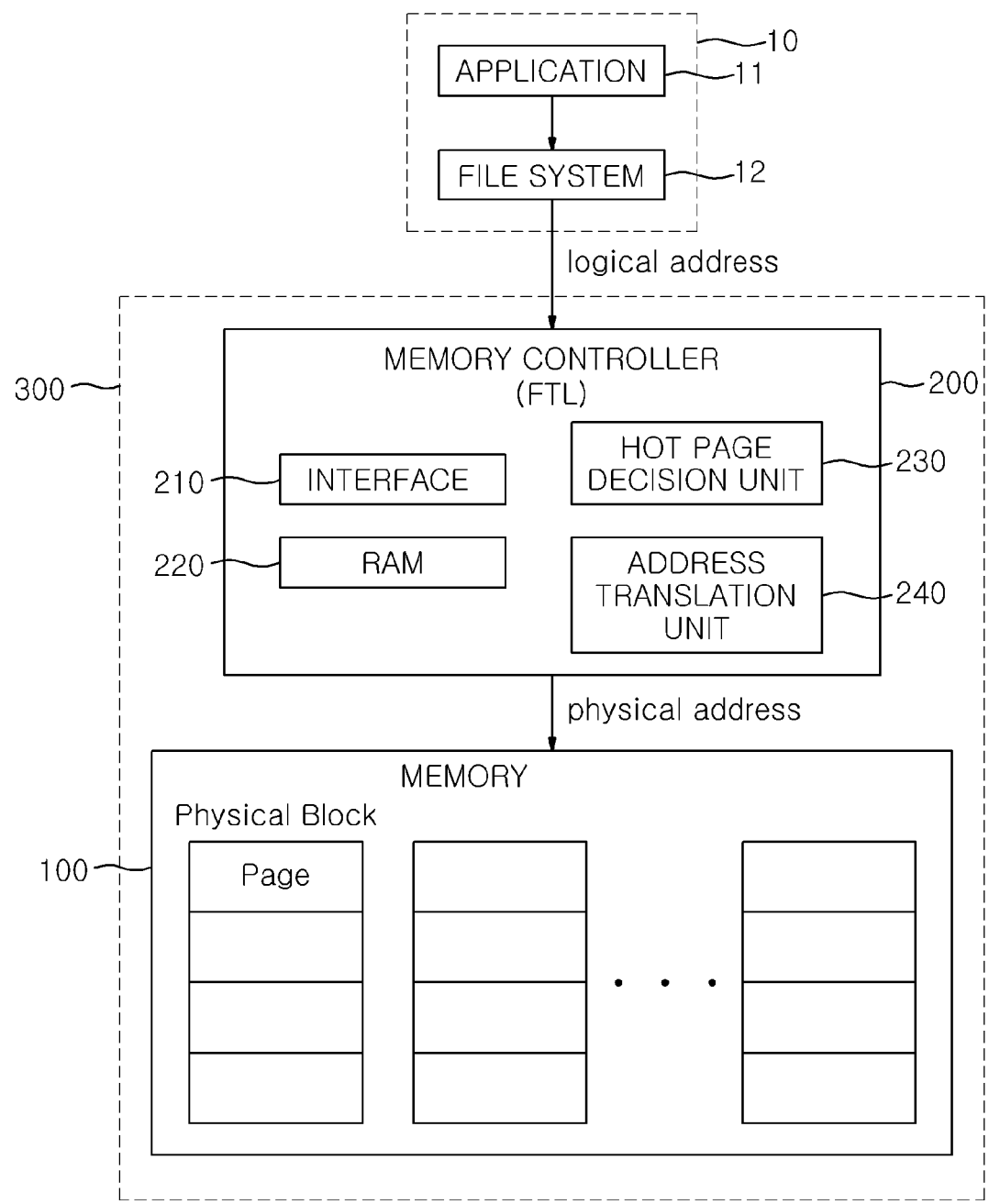
FIGS. 2A and 2B are diagrams showing the configuration of a flash memory device according to an embodiment of the present invention.
Figure 2B:
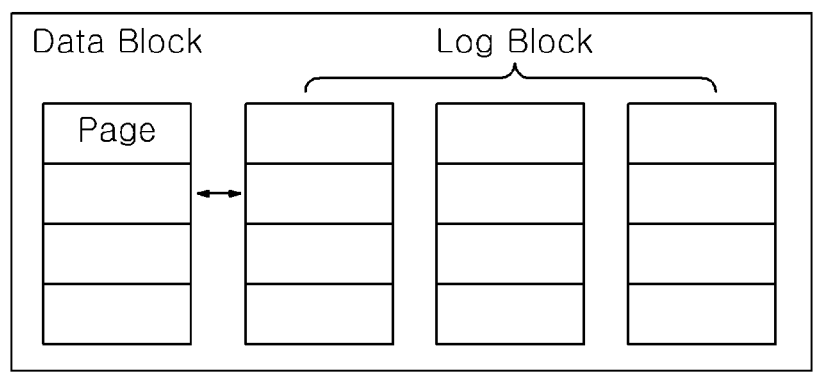

FIGS. 2A and 2B are diagrams showing the schematic configuration of a flash memory device according to an embodiment of the present invention.

Referring to FIG. 2A, a flash memory device 300 includes memory 100, a memory controller 200, etc. In the present invention, the flash memory device 300 includes not only an independent device for storing data, such as a Solid State Drive (SSD) or Universal Serial Bus (USB) memory, but also all cases where memory is contained and implemented in portable devices, such as a digital camera or an MP3 player, and is electrically connected to a host 10, such as a Personal Computer (PC) or a notebook computer, via an interface 210. The host 10 may be or may not be implemented using a file system 12. In the case of the host 10 that uses the file system 12, an application 11 may read, write, erase or update data, stored in the form of a file, with respect to the flash memory device 300 through the file system 12. In the case of the host 10 that does not use the file system 12, the application 11 may read, write, erase or update data with respect to the flash memory device 300 by simply referring to an address.

The memory controller 200 reads, writes, and erases data by driving the interface 210 and the memory 100. The read/write operation occurring in the memory 100 is performed on a page basis, and the erasure operation is performed on a block basis. Further, since the memory controller 200 cannot perform the operation of overwriting data to a previously written page due to the physical characteristics thereof, it performs an erasure operation before a write operation, and determines a location at which data input through the interface 210 is to be stored and writes data to the determined location, upon performing a write operation.

The memory controller 200 converts an externally received data input/output request in conformity with the characteristics of the memory 100 using a Flash Translation Layer (FTL) algorithm. Generally, FTLs are classified into a page-based FTL, a block-based FTL, and a hybrid-based FTL according to an address mapping technique. The classified techniques may be easily understood from related known technology and technical documents, and thus a detailed description thereof will be omitted here (for example, Korean Unexamined Patent Publication No. 2011-0012062).

The memory controller 200 receives a logical address from the application 11 or the file system 12, and translates the logical address into a physical address. That is, the memory controller 200 manages correspondence between the logical addresses and the physical addresses of the memory 100, allocates physical blocks to which corresponding data is to be stored so as to write data to the memory 100, and refers to an address mapping table stored in the Random Access Memory (RAM) 220 of the memory controller 200 so as to allocate physical blocks.

Here, the address mapping table includes information about mapping between the Logical Block Number (LBN) of a data block input from the host 10 and the Physical Block Number (PBN) of each physical block in the memory, and logical block numbers may be translated into physical block numbers using such mapping information. Generally, logical block numbers are numbers allocated to respective data blocks by the host 10, and physical block numbers are numbers sequentially allocated to the respective physical blocks in the memory.

FIG. 2B is a diagram showing an example of a plurality of physical blocks corresponding to a logical block having a single logical address.

The file system may freely update data of a single page several times. However, in actual flash memory, in-place overwriting cannot be physically performed, so that an FTL writes a newly updated version of page data to the subsequent page (empty page) of the same physical block, and invalidates and indicates a physical page in which a previous version of the data of the updated page is stored. The physical block including the invalidated data is also referred to as a 'dirty block.'

In this way, when the update of data in a single page or in a plurality of pages is repeated in the file system, the FTL selects a physical block (empty block) other than a currently enabled physical block, and causes the selected empty block to additionally correspond to the current logical address. Here, an initial physical block directly corresponding to the Logical Block Number (LBN) may be referred to as a 'data block,' and a physical block additionally corresponding thereto may be referred to as a 'log block.'

In FIG. 2B, an example in which four physical blocks correspond to a single LBN is shown. Among the four physical blocks, an initial physical block may be referred to as a 'data block,' and the remaining three physical blocks may be referred to as 'log blocks.'

In the file system, as the update of data is repeated, a large number of blocks are physically used to correspond to a single LBN. Therefore, in practice, the available storage space of the flash memory may be more rapidly reduced than that detected by the file system. If the physical available storage space of the flash memory becomes less than a predetermined threshold level, the FTL performs an operation of collecting pieces of data, scattered at physically different locations (pieces of data corresponding to a single LBN), on a single physical block, and this operation is called a merge operation.

When the merge operation is performed, the latest version of data is stored in a single physical block (a currently empty block, or a new target block). Here, the sequence of storage may be implemented in conformity with the addresses of logical pages, and this status may be called an "in-place" status.

Once the latest version of data has been stored in new target blocks, physical blocks in which previous versions of data are stored are erased, and then available storage spaces are created.

Since the merge operation itself inquires about information about individual blocks, it may influence wear-leveling and reduce the lifetime of the flash memory device. Accordingly, the present invention prevents unnecessary information inquiries for wear-leveling from being performed in consideration of wear-leveling during the procedure of performing the merge operation. Typical wear-leveling is well known and has been described in the background art above, and thus a detailed description thereof will be omitted. Below, the technology of the present invention considering wear-leveling upon performing the merge operation will be described.

The memory controller 200 according to the present invention includes a processor(not shown). The processor may comprise a plurality of sub-modules, for example, a hot page decision unit 230, an address translation unit 240, etc., as shown in FIG. 2A.

The hot page decision unit 230 classifies pages in each block into hot pages and cold pages based on a predetermined criterion, and pieces of information about the classified pages are temporarily stored in the RAM 220. The predetermined criterion includes the update frequency of each page and/or at least one of the attributes (characteristics) of data to be written to the page. That is, the corresponding page may be defined as a hot page in consideration of a page in which update frequently occurs, or based on the attributes of a file stored in the page. The corresponding pages may be classified as a hot page if the attributes of the file correspond to meta-information about the file, and denote the creation/revision dates or the extension of the file. For another example, the hot page may be a document file having a possibility of being revised frequently, for example, a file having an extension such as "doc", "ppt", "xls", "txt", etc., if the creation date of which is a recent date, or the revision date of which has been recorded several times.

Further, when the predetermined criterion is the update frequency of a page, it may be a case where the number of updates is equal to or greater than two, or where the number of updates is the number of times 'X' defined by the intention of a user and/or the object of application, and the present invention is not limited to such a case.

Meanwhile, when a physical block includes a plurality of hot pages, information update frequently occurs in the physical block, and thus a large number of erasure operations may occur. Therefore, upon performing the merge operation, it is preferable to perform wear-leveling by distributing hot pages, and for this operation, the address translation unit 240 of the present invention respectively arranges the classified hot pages in different target blocks when there is a plurality of the classified hot pages. The target blocks are physical blocks that are targets to which data stored in the physical blocks is to be copied.

When the number of the classified hot pages is one or less, the address translation unit 240 copies data stored in at least one existing physical block corresponding to the logical block to a target block, defines the target block as an information block, erases the at least one existing physical block, and defines the existing physical block as an empty block. Here, the information block denotes a block in which data is stored, and an empty block denotes a block in which data is not stored and which is available.

When the classified hot pages are respectively arranged in the target blocks, the address translation unit 240 sequentially arranges the classified cold pages in the remaining pages of the target blocks. If the predetermined criterion is the number of updates of the corresponding page, the hot page decision unit 230 searches for pages in which the number of updates is equal to or greater than 'X', defines the found pages, in which the number of updates is equal to or greater than 'X,' as hot pages, and also defines pages, in which the number of updates is less than 'X' as cold pages. Further, according to the total number of the classified hot pages, whether to perform a normal merge operation or an improved merge operation (a merge operation of distributing hot pages) is determined. That is, if the number of hot pages is 0 or 1, the normal merge operation is performed, whereas if the number of hot pages is equal to or greater than 2, the improved merge operation according to the present invention is performed because hot pages must be distributed.

The normal merge operation is performed as follows.

First, the memory controller 200 searches for a target block so as to transfer valid data from an existing information block. Further, the memory controller 200 copies the valid data stored in the information block to the target block, defines the target block as a new information block, performs an erasure operation on the existing information block, and then defines the erased information block as an empty block.

The improved merge operation is performed as follows. FIGS. 3A and 3B shows examples of the improved merge operation.

First, the memory controller 200 searches for a plurality of target blocks to be defined as new information blocks, and transfers each of single hot page to the each single target blocks, respectively. Instead of transferring all valid data stored in existing information blocks into the single target block (which is the conventional normal merge operation). Further, the memory controller 200 fills the remaining area of the target blocks (one or all of the target blocks, which may be different depending on examples) with cold pages, and thereafter defines the target blocks as new information blocks, and then erases the existing information blocks. Here, the address translation unit 240 records the page addresses of pages, located in physical blocks different from a physical block corresponding to an existing logical block, in a separate address mapping table, thus enabling prompt information inquires to be performed when information about correspondence between the logical blocks and the physical blocks is inquired about.

As described above, when the merge operation is performed, hot pages and cold pages are conceptually separated and differently handled, and the hot pages are respectively distributed to empty blocks, so that concentration of an erasure operation on a specific physical block may be avoided, thus efficiently performing wear-leveling. That is, the present invention prevents unnecessary information inquiries for wear-leveling from being performed by considering wear-leveling while performing a merge operation, thus obtaining the advantages of maximizing the performance of the flash memory device and lengthening the usage lifespan of the flash memory device.

Meanwhile, since different target blocks in which hot pages are respectively arranged are empty blocks, a plurality of empty blocks may be consumed and then the data storage efficiency of the flash memory device 300 may be deteriorated if a number of target blocks identical to the number of hot pages are merely selected and the hot pages are distributed to the selected target blocks. Therefore, in the present invention, the address translation unit 240 selects at least one victim block including only cold pages without including hot pages if there is a plurality of the classified hot pages, and distributes and arranges at least some of the cold pages of the victim block to and in a plurality of target blocks. By means of this improved merge operation, data is stored in a number of physical blocks identical to the LBN, and previous versions of blocks are erased, thus enabling an available storage space to be sufficiently created.

For example, as shown in FIG. 3A, it is assumed that two hot pages and two cold pages are arranged in a single information block. In this case, in order to arrange the hot pages in different empty blocks, respectively, two empty blocks are allocated as target blocks, and an erasure operation is performed on the existing information block, and then the existing information block is defined as an empty block. Since valid data stored in a single information block is divided and separately stored in two empty blocks, it may cause deterioration of the available storage space of the flash memory device 300.

However, as shown in FIG. 3B, when hot pages are distributed, if a victim block is selected in addition to an existing information block, and hot pages are respectively arranged in empty blocks (target blocks), and cold pages of the victim block are distributed to and arranged in the target blocks, pieces of valid data stored in the two information blocks are divided and stored in the two empty blocks, and thus the available storage space of the flash memory device 300 is not reduced. In this case, the address translation unit 240 preferably selects a block, in which the number of erasures is equal to or less than a predetermined reference value or is a minimum value, from among existing data blocks which do not include hot pages, as the victim block so as to perform wear-leveling.

<Description of Method>

Figure 5:
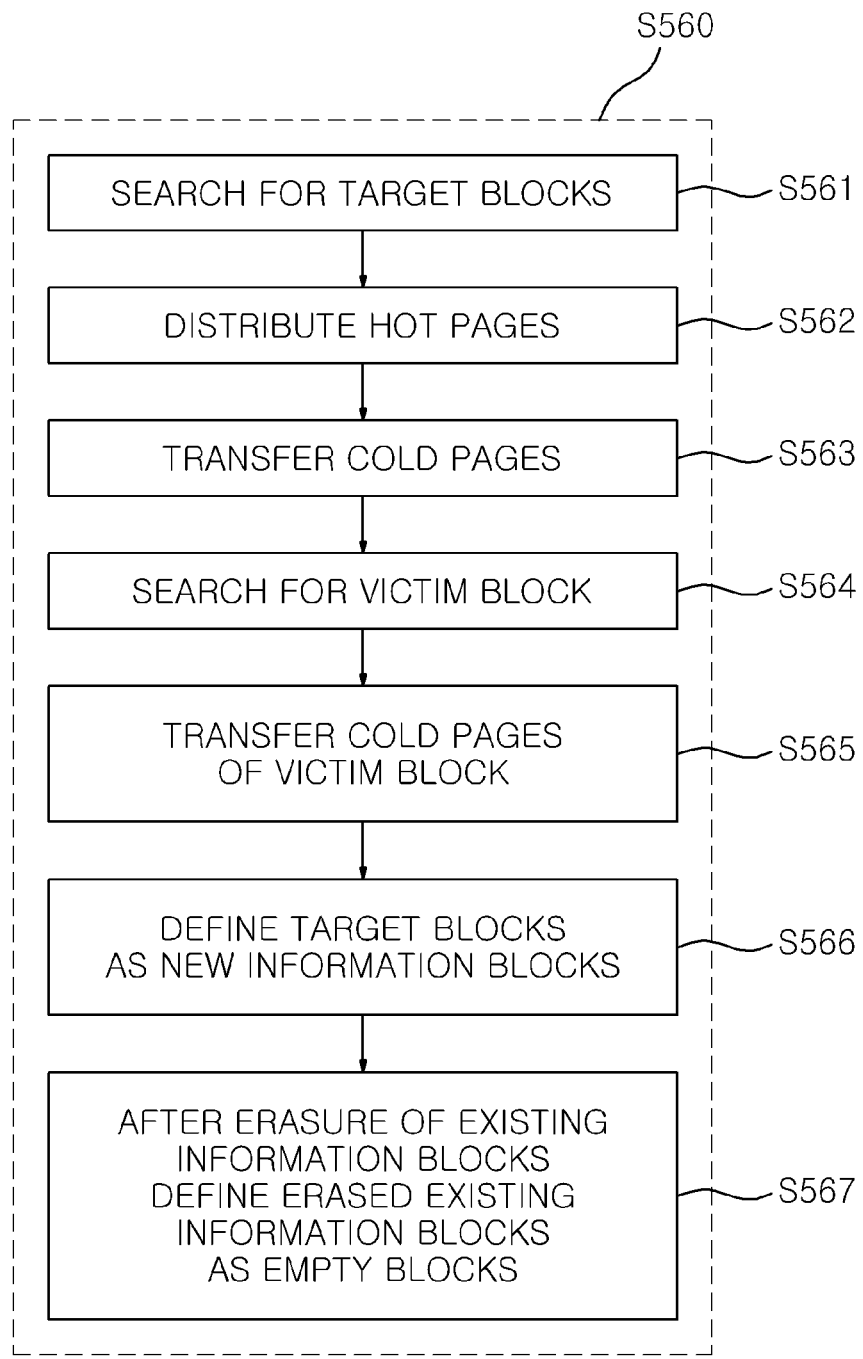
FIG. 5 is a flowchart showing a case where merging is performed using a victim block upon distributing hot pages.

A data management method of the memory controller according to an embodiment of the present invention will be described with reference to the diagrams shown in FIGS. 5 and 6 together with the flowchart of FIG. 4, wherein for convenience of description, individual steps are numbered and described. This method may be executed by a processor (not shown) included in the memory controller 200.

1. Determination of Whether Pages Satisfy Predetermined Criterion <S410>

This is the step of determining whether pages in the physical blocks of the memory 100 satisfy a predetermined criterion, and the predetermined criterion includes the update frequency of each page or at least one of the attributes (characteristics) of data to be written to the page. That is, the corresponding page is defined as a hot page in consideration of a page in which update frequently occurs, or the attributes of a file stored in the page, hot data is stored in each hot page, and cold data is stored in each cold page. The attributes of the file denote meta-information about the file, and denote the creation/revision dates or the extension of the file. In FIG. 4, a case where the predetermined criterion is the update frequency of each page is shown, wherein the number of updates may be equal to or greater than 2 or may be the number of updates designated by the intention of the user, and the present invention is not limited to such a case.

Meanwhile, when a physical block includes a plurality of hot pages, frequent information update occurs in the physical block, so that a large number of erasure operations may occur. Therefore, it is preferable to distribute hot pages and perform wear-leveling upon performing a merge operation, and for this operation, the following steps are performed in the present invention.

2. Classification of Hot Pages and Cold Pages <S420>

At step S410, pages in the physical block are classified into hot pages and cold pages.

3. Determination of Whether all Pages have been Inquired About <S430>

Whether pages other than hot pages and cold pages classified at step S420 are present is determined based on a search, thus allowing all pages to be classified as hot pages or cold pages.

4. Determination of Whether the Number of Hot Pages is Equal to or Greater than 2<S440>

If all pages are classified as hot pages or cold pages, it is determined whether the number of the classified hot pages is plural.

Next, depending on the total number of the classified hot pages, it is determined whether to perform a normal merge operation <S450>, or to perform an improved merge operation according to the present invention (a merge operation of distributing hot pages) <S460>. That is, if the number of hot pages is 0 or 1, the normal merge operation is performed, whereas if the number of hot pages is two or more, the improved merge operation is performed because hot pages must be distributed.

First, a case where the number of classified hot pages is one or less will be described below.

5. Performance of Merge Operation <S450>

5-1. Target Block Search <S451>

In order to transfer valid data from an existing information block A, a target block B is searched for. In the present invention, an information block is a block in which data is stored, and a target block is a physical block that is a target to which data stored in a physical block is to be copied.

5-2. Copy to Target Block <S452>

Valid data stored in at least one existing physical block (information block A) corresponding to a logical block is copied to the target block B.

5-3. Definition of Target Block as New Information Block <S453>

The target block B is defined as a new information block.

5-4. After Erasure of Existing Information Block, Definition of it as Empty Block <S454>

After the at least one existing information block A has been erased, the block A is defined as an empty block.

Next, a case where the number of classified hot pages is two or more will be described.

6. Performance of Improved Merge Operation <S460>

This is the step of, if the number of classified hot pages is plural, arranging the classified hot pages in different target blocks, respectively, and sequentially arranging the classified cold pages in the remaining pages of the target blocks, and this step is performed as follows.

6-1. Target Block Searching <S461>

First, target blocks to be defined as new information blocks are searched for.

6-2. Distribution of Hot Pages <S462>

The classified hot pages are respectively transferred to different target blocks.

6-3. Cold Page Transfer <S463>

The remaining pages of the target blocks are filled with one or more cold pages.

6-4. Definition of Target Blocks as New Information Blocks <S464>

Finally, the target blocks are defined as new information blocks.

6-5. After Erasure of Existing Information Blocks, Definition of them as Empty Blocks <S465>

After the existing information blocks have been erased, the existing information blocks are defined as empty blocks.

As described above, upon performing a merge operation, hot pages and cold pages are separated, and the hot pages are evenly distributed to empty blocks, so that concentration of an erase operation on a specific physical block may be avoided, thus performing efficient wear-leveling.

Meanwhile, since different target blocks in which the hot pages are respectively arranged are empty blocks, a number of empty blocks identical to the number of hot pages must be consumed, and thus the available storage space of the flash memory device 300 may be reduced. Therefore, as shown in FIG. 5, upon performing the improved merge operation (S560) according to the present invention, target blocks to be defined as new information blocks are searched for (S561), the classified hot pages are respectively transferred to different target blocks (S562), and the remaining pages of the target blocks are filled with one or more cold pages (S563). Further, a victim block, in which the number of erasures is equal to or less than a predetermined preference value or is a minimum value, is selected from among the blocks which do not include hot pages (S564), and at least some of cold pages of the victim block are distributed to and arranged in the target blocks (S565). When the victim block is selected, it is preferable to select a block, in which the number of erasures is equal to or less than the predetermined reference value or is a minimum value, as the victim block, thus performing efficient wear-leveling. Finally, the target blocks are defined as new information blocks (S566), and the existing information blocks are erased, and thereafter the existing information blocks are defined as empty blocks (S567). In regard to these steps, a description will be made with reference to FIG. 6.

Figure 6:
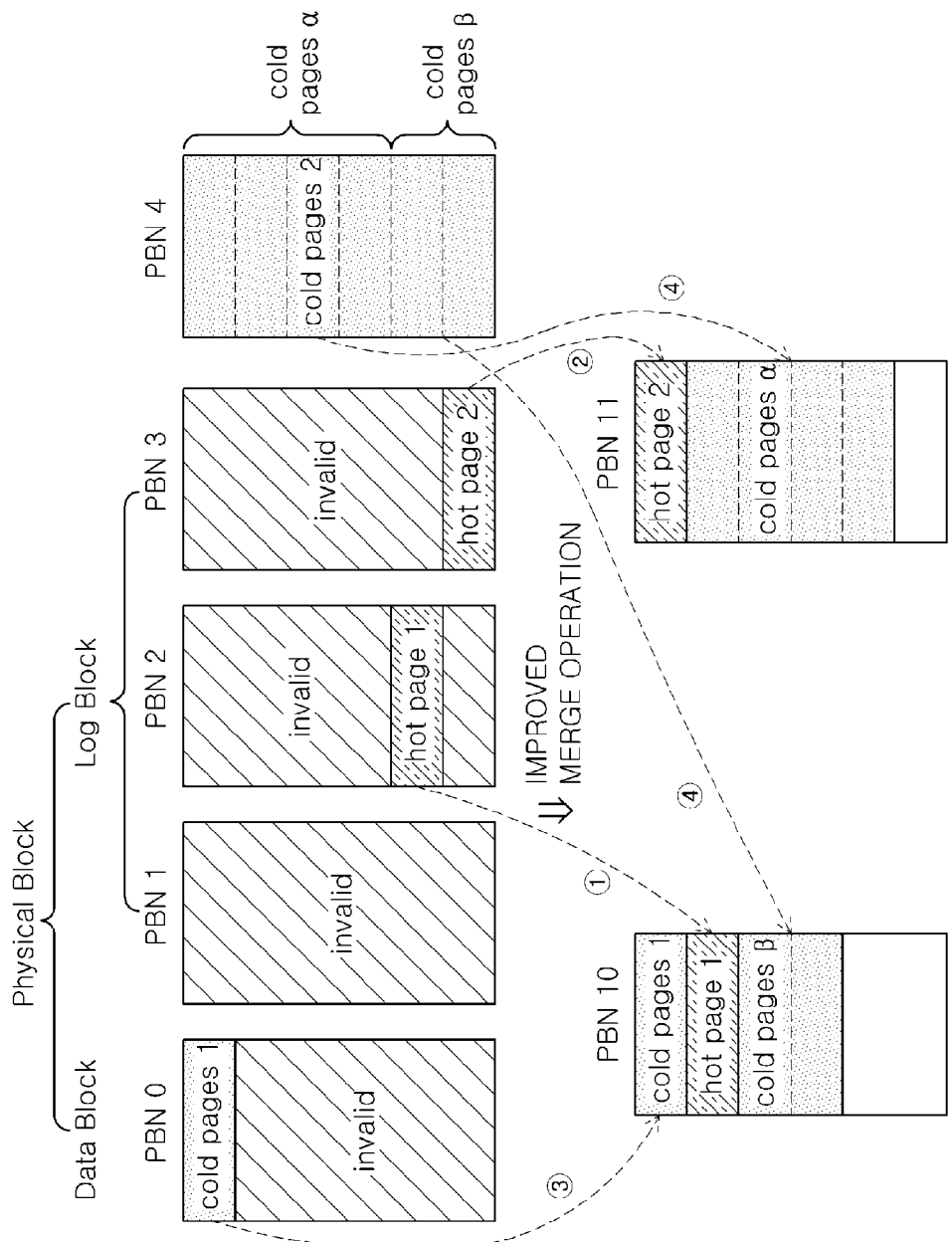
FIG. 6 is a diagram showing the data management method of FIG. 5.

Referring to FIG. 6, there is data block PBN 0 corresponding to LBN 0, and there are log blocks PBNs 1, 2, and 3 in which records of PBN 0 are stored, and hot pages 1 and 2 are respectively arranged in PBNs 2 and 3. In this case, distribution of hot pages is performed as follows.

First, empty blocks PBNs 10 and 11 in which hot pages 1 and 2 are to be respectively arranged are searched for, and the hot pages 1 and 2 are arranged in the empty blocks PBNs 10 and 11 (①, ②). Further, cold pages 1 of PBN 0 are copied to PBN 10 (③), and PBNs 0, 2, and 3 are erased and defined as empty blocks. Next, victim block PBN 4 filled with cold pages 2 is searched for, and cold pages 2 of PBN 4 are arranged in PBNs 10 and 11. Here, arrangement may be performed by dividing cold pages 2 into cold pages α and β and distributing the cold pages α and β, as shown in (b), in consideration of the remaining spaces of PBNs 10 and 11 in which data can be stored ((④)).

Figure 7:
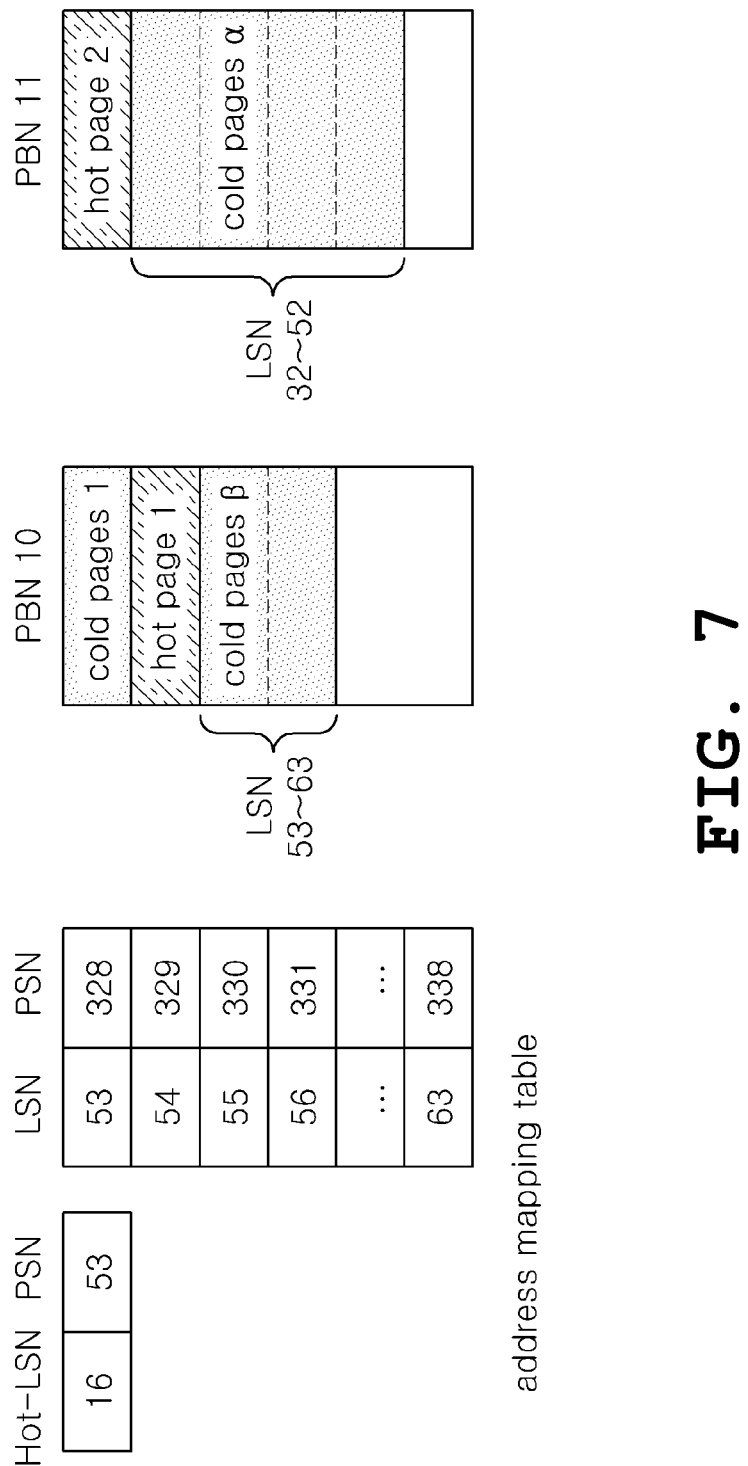
FIG. 7 is a diagram showing a case where information about mapping between logical blocks and physical blocks is managed in a separate table after an improved merge operation has been performed according to the present invention.

In the present invention, pages which are located in physical blocks different from a physical block corresponding to the existing logical block due to the improved merge operation are managed in a separate address mapping table, as shown in FIG. 7, thus enabling prompt information inquiries to be performed when information about correspondence between logical blocks and physical blocks is inquired about. That is, pieces of data corresponding to Logical Sector Numbers (LSNs) 53 to 63 and pieces of data corresponding to LSNs 32 to belong to the same LBN, but the pieces of data corresponding to LSNs 53 to 63 and the pieces of data corresponding to LSNs 32 to 52 are stored in different physical blocks by means of the improved merge operation according to the present invention. In this regard, in an LBN-PBN mapping table, an LBN corresponding to LSNs 32 to 63 and PBN 11 (the physical address of a physical block to which LSNs 32 to 52 belong) are stored such that the LBN and the PBN 11 are mapped to each other. A physical address (Physical Sector Number: PSN) corresponding to LSNs 53 to 63 separately stored in PBN 10 is stored and managed in the separate address mapping table of FIG. 7.

Meanwhile, the data management method according to embodiments of the present invention may be implemented in the form of program instructions that are executable by various types of computer means, and may be recorded in a computer-readable storage medium. The computer-readable storage medium may include program instructions, data files, and data structures either independently or in combination. The program instructions stored in the medium may be designed and configured especially for the present invention or may be known to and usable by those skilled in the art of computer software. Examples of the computer-readable storage medium may include a magnetic medium such as a hard disk, a floppy disk, or magnetic tape, an optical medium such as Compact Disk-Read Only Memory (CD-ROM) or a Digital Versatile Disk (DVD), a magneto-optical medium such as a floptical disk, and a hardware device such as ROM, Random Access Memory (RAM), or flash memory which is especially configured to store and execute program instructions. Examples of the program instructions include not only such machine language code as created by a compiler, but also such high-level language code as being executable by a computer using an interpreter or the like. The hardware device can be configured to function as one or more software modules so as to perform the operation of the present invention, and vice versa.

As described above, in accordance with the present invention, hot pages and cold pages are determined upon performing a merge operation, and the hot pages are respectively distributed to empty blocks, so that concentration of an erase operation on a specific physical block may be avoided, thus wear-leveling may be performed more efficiently.

Further, the present invention suggests a new improved merge operation considering more efficient wear-leveling, so that managing/log information may be less frequently inquired than otherwise more frequently inquired after a merge operation for wear-leveling. Thus the present invention can maximize the performance of a flash memory device and lengthening the usage lifespan of the flash memory device.

Furthermore, the present invention is configured to, if there is a plurality of classified hot pages, select at least one victim block from among data blocks which do not include hot pages, and distribute and arrange at least some of cold pages of the victim block to and in a plurality of target blocks, and so the efficiency of data storage and the effect of wear-leveling may be improved, thus minimizing the deterioration of the performance of a flash memory device.

The above description has been made merely to exemplarily describe the technical spirit of the present invention, and those skilled in the art to which the present invention pertains will appreciate that various changes and modifications are possible, without departing from the essential features of the invention. Therefore, the embodiments disclosed in the present invention are intended to describe the technical spirit of the present invention rather than to restrict the technical spirit thereof, and the scope of the technical spirit of the present invention is not limited by these embodiments. The scope of the present invention should be defined by the accompanying claims, and all technical spirits within an equivalent scope of the claims should be interpreted as being included in the scope of the present invention.

What is claimed is:

1. A memory controller for managing correspondence between logical addresses and physical addresses of memory including a plurality of blocks, each having a plurality of pages, comprising:
    a processor configured to:
        classify pages in each block into hot pages and cold pages based on a predetermined criterion;
        select a first block to be merged which includes a first hot page and a second hot page;
        select at least one second block to be merged which does not include a hot page; and
        merge the first block and the at least one second block by:
            arranging the first hot page in a first target block,
            arranging the second hot page in a second target block,
            arranging a first part of pages in the at least one second block in the first target block, and
            arranging a second part of the pages in the least one second block in the second target block.

2. The memory controller of claim 1, wherein the predetermined criterion includes at least one of update frequency of each page or attributes of data to be written to the page.

3. The memory controller of claim 1, wherein the processor is further configured to:
    if the first hot page and the second hot page are respectively arranged in the first target block and the second target block, sequentially arrange the classified cold pages included in the first block in the first target block and the second target block.

4. The memory controller of claim 1, wherein the processor is further configured to:
    select the at least one second block, in which a number of erasures is equal to or less than a predetermined reference value, or is a least value among blocks which do not include hot pages.

5. The memory controller of claim 1, wherein the processor is further configured to:
    record page addresses of the first hot page and the second hot pages, previously located in the first block corresponding to existing first logical block address and newly located in the first target block and the second target block now different from each other after merging the first block and the at least one second block, in an additional address mapping table.

6. A data management method of a memory controller for managing correspondence between logical addresses and physical addresses of memory including a plurality of blocks, each having a plurality of pages, comprising:
classifying, by a processor, pages in each block into hot pages and cold pages based on a predetermined criterion;
selecting, by the processor, a first block to be merged which includes a first hot page and a second hot page;
selecting, by the processor, at least one second block to be merged which dose not include a hot page; and
merging, by the processor, the first block and the at least one second block by:
arranging the first hot page in a first target block,
arranging the second hot page in a second target block,
arranging a first part of pages in the at least one second block in the first target block, and
arranging a second part of the pages in the at least one second block in the second target block.

7. The data management method of claim 6, wherein the predetermined criterion includes at least one of update frequency of each page or attributes of data to be written to the page.

8. The data management method of claim 6, further comprising:
if the first hot page and the second hot page are respectively arranged in the first target block and the second target block, sequentially arranging, by the processor, the classified cold pages included in the first block in the first target block and the second target block.

9. The data management method of claim 6, further comprising:
recording, by the processor, page addresses of the first hot page and the second hot page, previously located in the first block corresponding to existing first logical block address and newly located in the first target block and the second target block now different from each other after merging the first block and the at least one second block, in an additional address mapping table.

10. A non-transitory computer-readable storage medium containing executable program instructions executed by a processor that stores a program for executing a method of managing a data of a memory controller for managing correspondence between logical addresses and physical addresses of memory including a plurality of blocks, each having a plurality of pages, comprising:
program instructions that classify pages in each block into hot pages and cold pages based on a predetermined criterion;
program instructions that select a first block to be merged which includes a first hot page and a second hot page;
program instructions the select at least one second block to be merged which dose not include a hot page; and
program instructions the merge the first block and the at least one second block by:
arranging the first hot page in a first target block,
arranging the second hot page in a second target block,
arranging a first part of pages in the at least one block in the first target block, and
arranging a second part of the pages in the at least one second block in the second target block.

* * * * *